(12) United States Patent
Satapathy et al.

(10) Patent No.: US 8,570,859 B1
(45) Date of Patent: Oct. 29, 2013

(54) HYBRID MESH NETWORK

(75) Inventors: Durga Prasad Satapathy, Olathe, KS (US); Bruce E. Hoffman, Overland Park, KS (US); Harold Wayne Johnson, Roach, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 297 days.

(21) Appl. No.: 13/036,266

(22) Filed: Feb. 28, 2011

Related U.S. Application Data

(62) Division of application No. 11/490,615, filed on Jul. 21, 2006, now abandoned.

(51) Int. Cl.
*H04L 1/00* (2006.01)

(52) U.S. Cl.
USPC ......................................... 370/225

(58) Field of Classification Search
USPC .......... 370/310, 315, 316, 319, 325, 216, 225
See application file for complete search history.

(56) References Cited

U.S. PATENT DOCUMENTS

| | | | | |
|---|---|---|---|---|
| 4,977,612 A | * | 12/1990 | Wilson | 455/166.1 |
| 6,954,435 B2 | * | 10/2005 | Billhartz et al. | 370/252 |
| 7,068,600 B2 | * | 6/2006 | Cain | 370/230.1 |
| 7,453,906 B2 | * | 11/2008 | Simonnet et al. | 370/469 |
| 7,499,409 B2 | * | 3/2009 | Srikrishna et al. | 370/252 |
| 7,616,961 B2 | * | 11/2009 | Billhartz | 455/452.2 |
| 7,706,285 B2 | * | 4/2010 | Srikrishna | 370/238 |
| 7,769,806 B2 | * | 8/2010 | Van Wie et al. | 709/203 |
| 7,864,694 B1 | * | 1/2011 | Rosselot et al. | 370/252 |
| 2007/0008891 A1 | * | 1/2007 | Kline et al. | 370/238 |

* cited by examiner

*Primary Examiner* — Chi Pham
*Assistant Examiner* — Robert Lopata

(57) ABSTRACT

A system and method for interconnecting multiple mesh transport medium technologies is disclosed. Two nodes are part of a mesh sub-network using a first access technology. The two nodes have at least two paths using the first access technology that couple the two nodes together. A third path using a second access technology also couples the two nodes together.

22 Claims, 10 Drawing Sheets

HYBRID MESH NETWORK

CROSS-REFERENCE TO RELATED APPLICATIONS

This application is a divisional of and claims priority to U.S. patent application Ser. No. 11/490,615, entitled "HYBRID MESH NETWORK," filed Jul. 21, 2006, which is related to U.S. patent application Ser. No. 11/490,796, entitled "DYNAMIC MANAGEMENT OF A HYBRID MESH NETWORK," filed Jul. 21, 2006, both of which are hereby incorporated by reference in their entirety.

FEDERALLY SPONSORED RESEARCH OR DEVELOPMENT

Not applicable.

MICROFICHE APPENDIX

Not applicable.

BACKGROUND OF THE INVENTION

1. Field of the Invention

The invention is related generally to the field of communications and, in particular, to communication network architectures.

2. Description of the Prior Art

Mesh network topologies are in wide use today. A mesh network is a network topology in which each node in the network has redundant connections to other nodes in the network. Many individual mesh networking technologies exist today, such as Wireless Fidelity (WiFi) mesh networks, common-carrier mesh networks (e.g., networks provided by DragonWave, Inc.), free space optics (FSO) mesh networks, and others.

Unfortunately, these mesh networks are limited to the particular performance characteristics, capabilities and capacity/range tradeoffs of a single access technology. As a result, these mesh networks are typically adjusted in response to deployment and capacity challenges by either the addition of more mesh nodes or the acceptance of lower performance levels, thus either greatly increasing the cost or the reducing the performance of the network.

SUMMARY OF THE INVENTION

A system and method for interconnecting multiple mesh transport medium technologies is disclosed. Two nodes are part of a mesh sub-network using a first access technology. The two nodes have at least two paths using the first access technology that couple the two nodes together. A third path using a second access technology also couples the two nodes together.

Additional embodiments and advantages of the present invention will be realized by those skilled in the art upon perusal of the following detailed description, taken in conjunction with the accompanying drawings.

DETAILED DESCRIPTION OF THE INVENTION

FIGS. 1-10 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
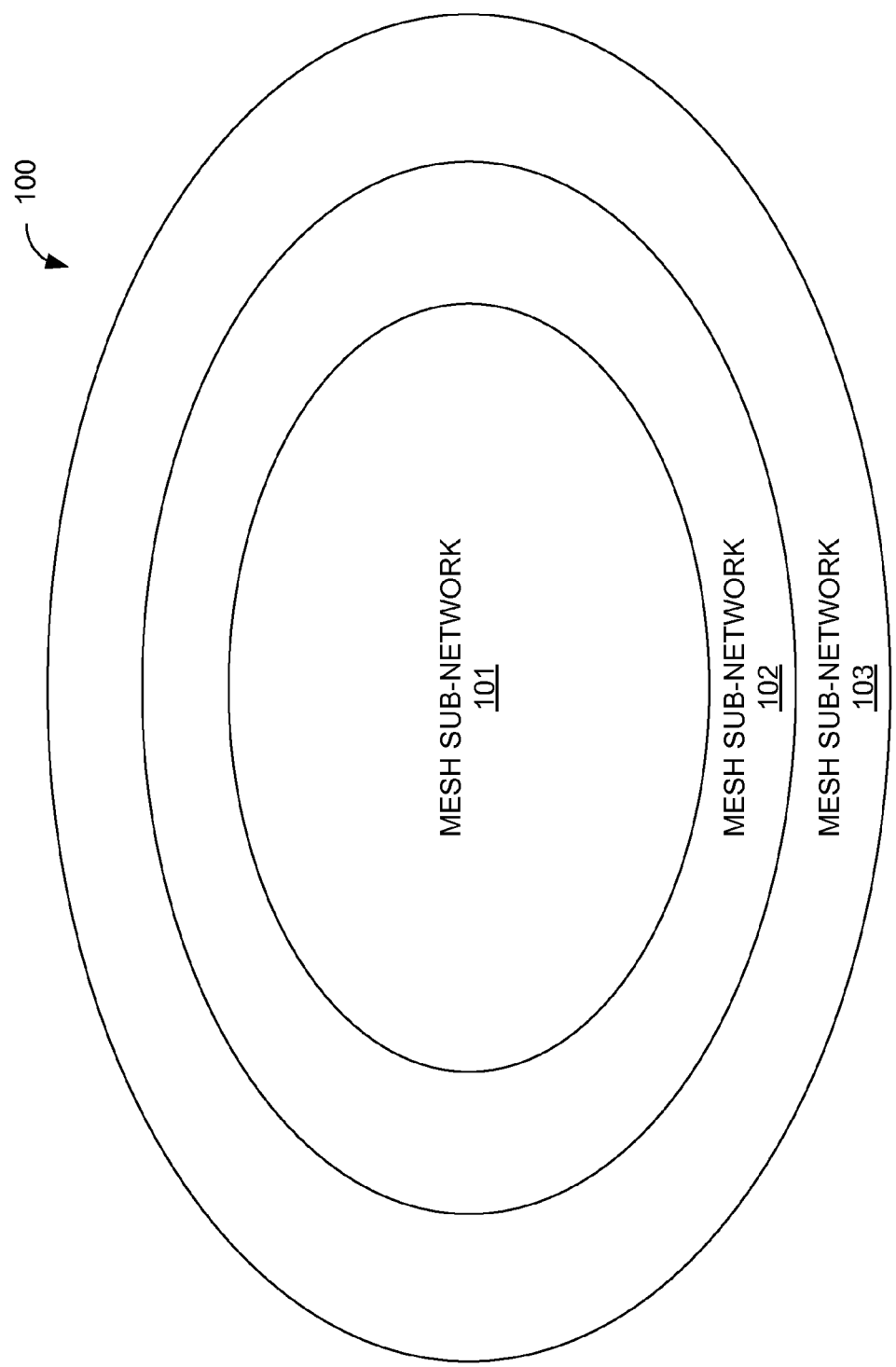
FIG. 1 is a block diagram of a hybrid mesh network in an example embodiment of the invention.

FIG. 1 is a block diagram of a hybrid mesh network 100 in an example embodiment of the invention. Generally, a hybrid mesh network is a network that includes a number of discrete access networks employing differing technologies, protocols, and media with potentially differing capacities, speeds, and propagation characteristics, but which are dynamically managed as a single network. Hybrid mesh network 100 comprises mesh sub-network 101, mesh sub-network 102, and mesh sub-network 103. Each of these mesh sub-networks 101, 102, 103 use a different access technology or transport medium technology, such as, for example, fiber-based technology, wireless microwave technology or wireline-based technology. Each access technology typically has its own set of range/capacity tradeoffs and performance characteristics inherent to the individual access technology. Such characteristics include, for example, one-way and round-trip latency, the jitter associated with each link/path/service, packet loss, and so on.

In one example embodiment of the invention, mesh sub-network 101 may be a fiber Metropolitan Area Network (MAN). By integrating different access technologies into a single mesh network, a wide variety of deployment choices become available, thus allowing the design engineer to tailor the particular mesh network deployed to the specific requirements for the network. In one example embodiment of the invention, the different mesh sub-networks overlap each other. For example, mesh sub-network 103 is the largest mesh sub-network and contains the other two mesh sub-networks 101, 102 inside the area covered by mesh sub-network 103. In another example embodiment of the invention, the different mesh sub-networks do not overlap each other, but are contained in separate geographic areas.

Figure 2:
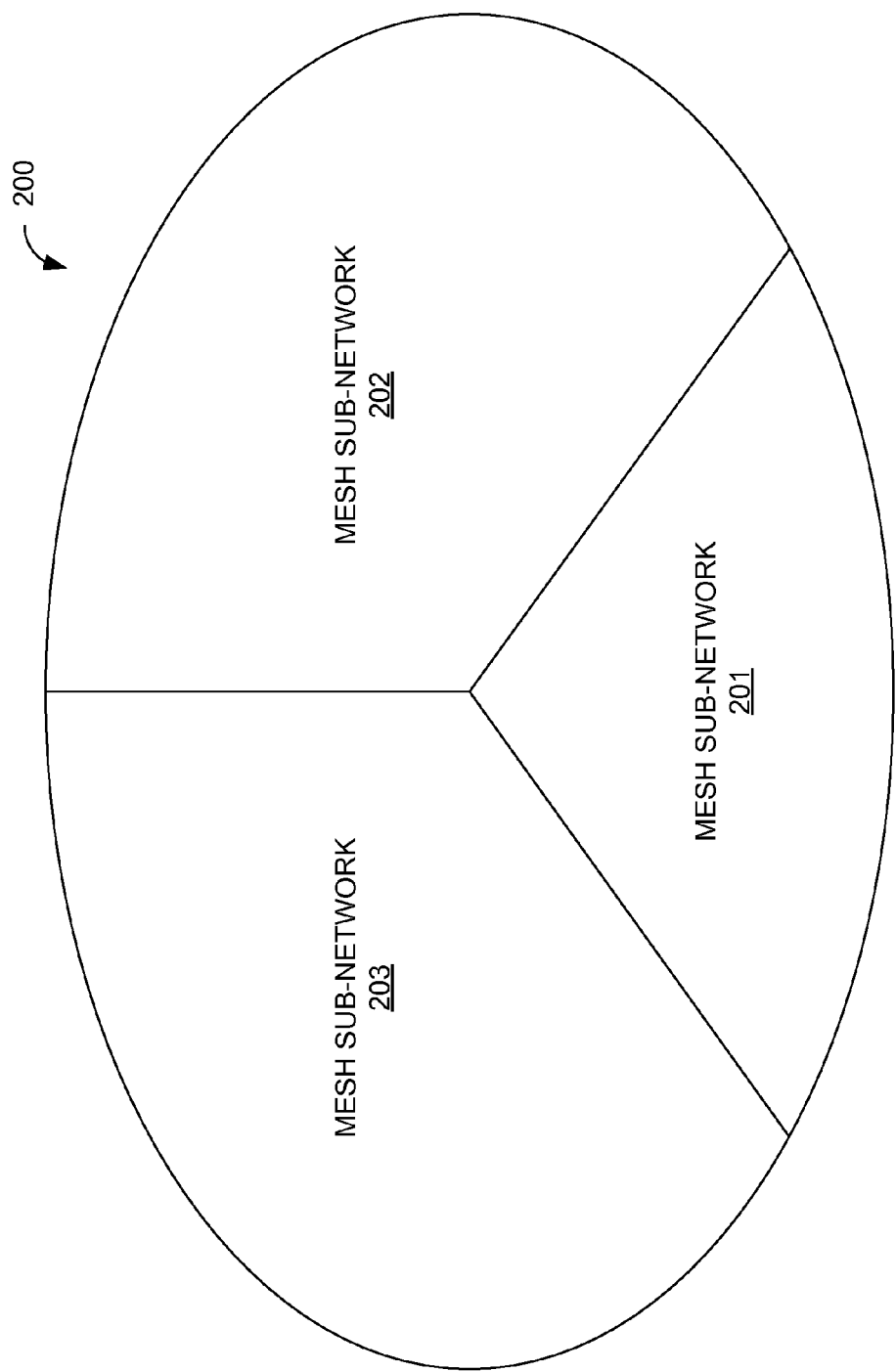
FIG. 2 is a block diagram of a pie topology hybrid mesh network in an example embodiment of the invention.
Figure 3:
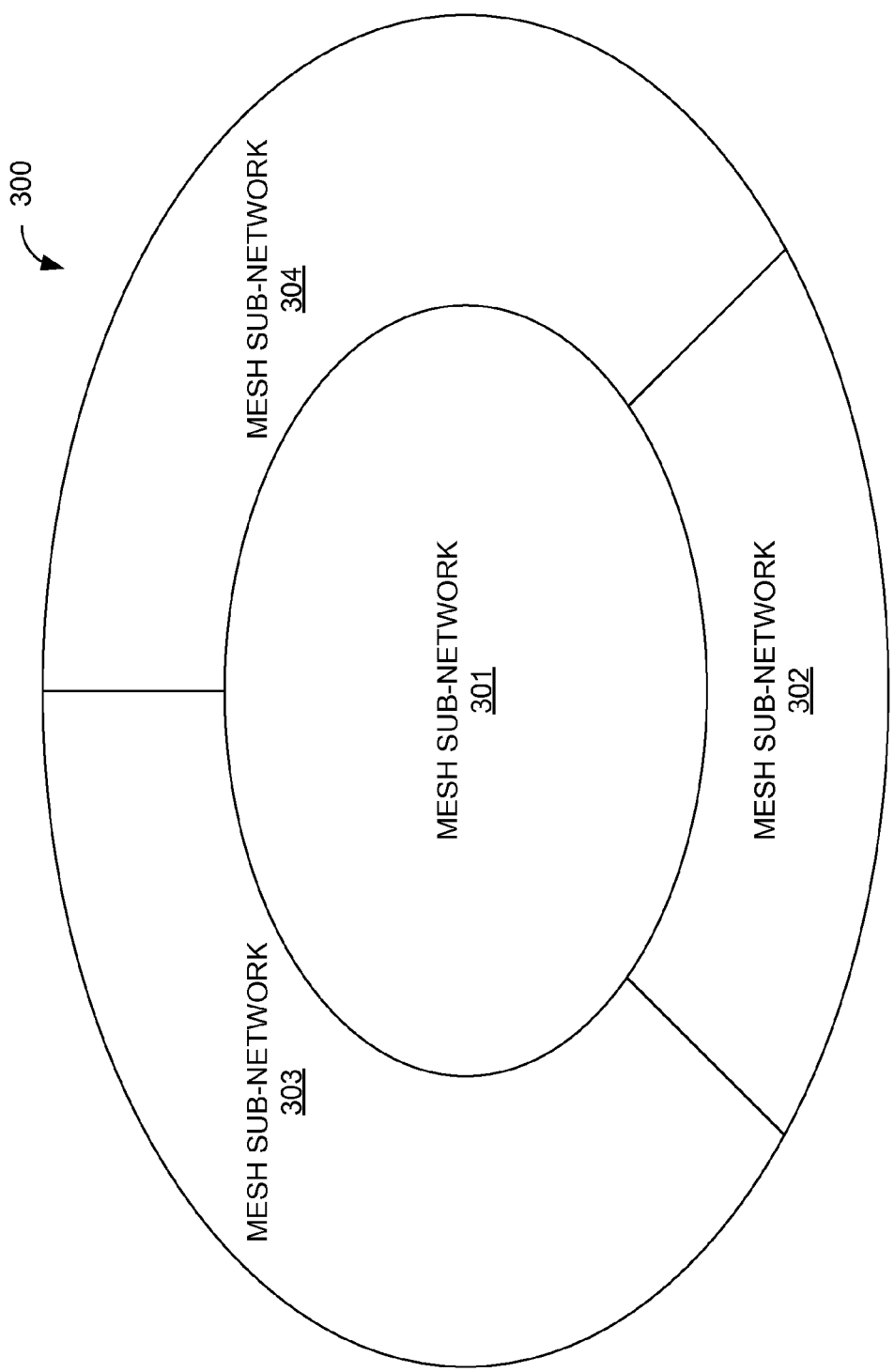
FIG. 3 is a block diagram of a mixed topology hybrid mesh network in an example embodiment of the invention.

A wide variety of network topologies are possible by integrating different mesh sub-networks into one hybrid mesh network. FIG. 2 is a block diagram of a pie topology hybrid mesh network 200 in an example embodiment of the invention. Hybrid mesh network 200 comprises mesh sub-network 201, mesh sub-network 202, and mesh sub-network 203. FIG. 3 is a block diagram of a mixed topology hybrid mesh network 300 in an example embodiment of the invention. Hybrid mesh network 300 comprises mesh sub-network 301, mesh sub-network 302, mesh sub-network 303 and mesh sub-network 304. Other embodiments exhibiting different hybrid mesh network typologies from those presented in FIGS. 1-3 are also possible.

Integrating different access or transport technologies allows service providers to leverage existing wireline and wireless assets that are already deployed. For example, hybrid mesh networks implemented over PCS (Personal Communications Service) or BRS (Broadband Radio Service) bands could leverage existing infrastructure such as fiber-based Metropolitan Area Network (MAN) facilities, existing underutilized wireline backhaul capability, existing PCS/BRS chassis infrastructure, tower space, and so forth. This leveraging allows for more cost-effective mesh networking and ease of deployment as compared to a complete overlay of a single mesh network based on a single technology.

Figure 4A:
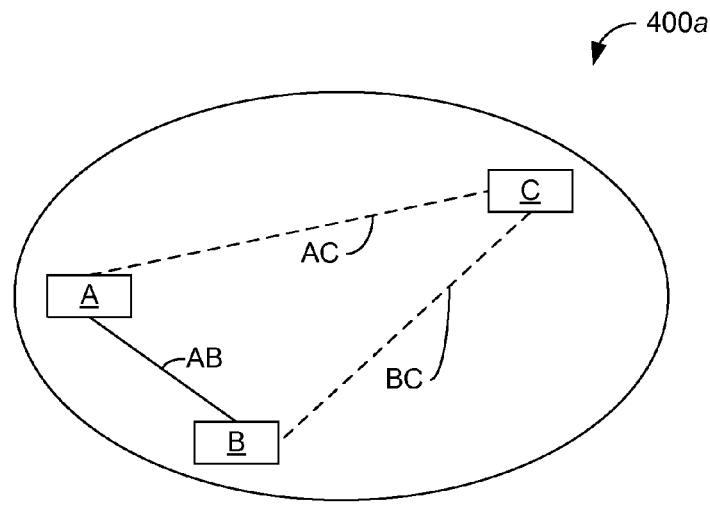
FIG. 4A is a diagram of a prior art single access technology mesh network.

For example, FIG. 4A depicts a prior art single access technology mesh network 400a. Mesh network 400a comprises nodes A, B and C, and links AB, AC, and BC. Loss of link AB would require rerouting to a path A-to-C-to-B over links AC and BC. For some attributes, the performance across links AC and BC may be less than the performance across link AB. Existence of a second mesh network employed in conjunction with the first mesh network 400a may improve performance.

Figure 4B:
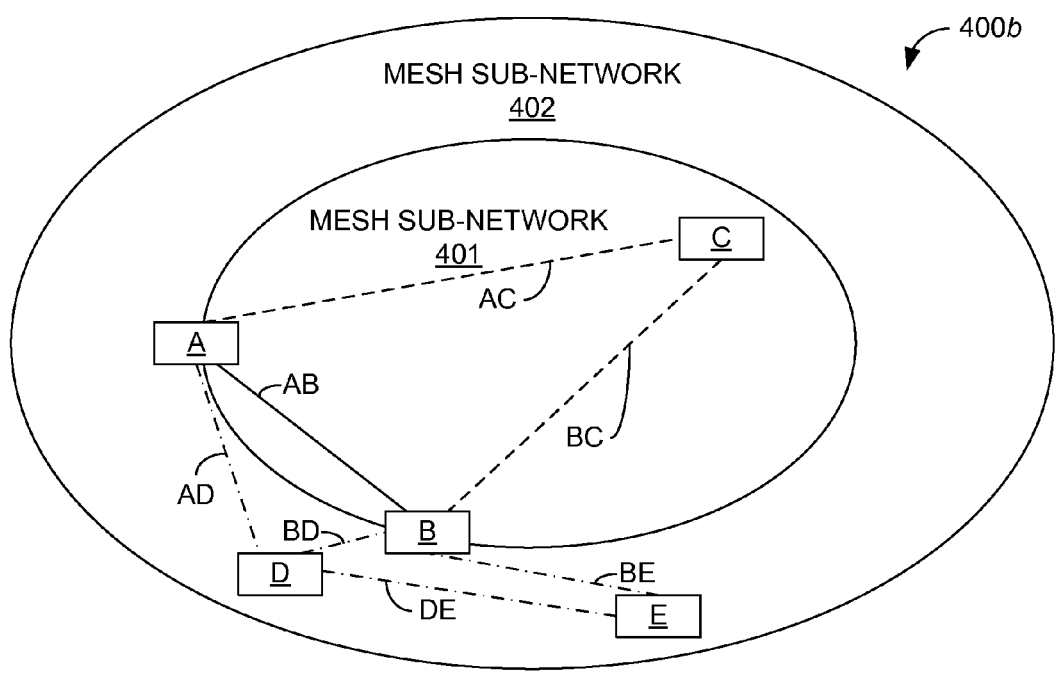
FIG. 4B is a diagram of hybrid mesh network in an example embodiment of the invention.

To this end, FIG. 4B illustrates a hybrid mesh network 400b in an example embodiment of the invention, wherein the mesh network 400a of FIG. 4A is employed as a mesh sub-network 401. Hybrid mesh network 400b has nodes A, B, C, D and E, and links AB, AC, BC, AD, BD, DE and BE, mesh sub-network 401 and mesh sub-network 402. Node C is in mesh sub-network 401, nodes D and E are included in mesh sub-network 402, and nodes A and B reside in both mesh sub-network 401 and mesh sub-network 402. Links AB, AC and BC use a first access technology, while links AD, BD, BE, and DE use a second access technology.

If link AB fails, the traffic across link AB can be rerouted to path A-to-C-to-B, or to path A-to-D-to-B. Path ADB may have better performance for some attributes than path ACB, even if the individual link ranges or capacities of the mesh sub-network 402 are smaller than that of mesh sub-network 1. For example, the capacity of path ADB may be less than the capacity of path ACB, but the latency of path ADB may be smaller than the latency of path ACB. In another example, the cost over path ACB may be higher than the cost over path ADB. Having additional redundant routes employing different access technologies allows more flexibility in rerouting traffic from the loss of a link. A link can be selected for the rerouted traffic based on the link attributes of the link to be replaced or on the type of traffic that is being rerouted. The additional links may be used to balance traffic across the mesh network 400b during normal operating conditions (i.e., in the absence of link failures).

Integrating different access technologies into a single hybrid mesh network may allow links between nodes that could not be directly connected using a single access technology. One of the limiting factors for a link with a given access technology is the length of the link. The length of a link may be limited by a number of different factors, such as absorption rates, antenna size limits, broadcast power limits, real estate constraints, fiber availability, latency, and others. The constraints on the length of a link may also vary depending on the type of access technology used for the link. For example, the constraints on the length of a fiber link are different than the constraints on the length of a microwave link.

Figure 5:
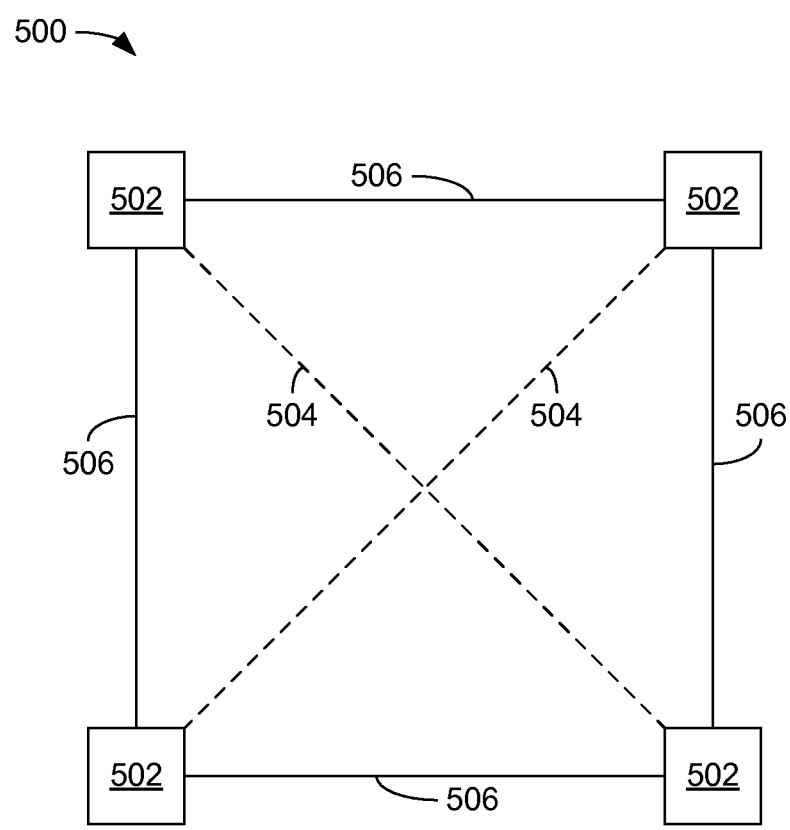
FIG. 5 is a block diagram of a hybrid mesh network in an example embodiment of the invention.

To illustrate the impact of access technology on link length, FIG. 5 depicts a hybrid mesh network 500 in an example embodiment of the invention. Hybrid mesh network 500 has four network nodes 502, and two different link types, links 504 and links 506. The node layout and number of nodes shown in mesh network 500 have been limited for clarity. Links 506 use a first access technology and links 504 use a second access technology. The second access technology allows links 504 to be longer than the links that utilize the first access technology 506. Links 506 are used to connect the nodes 502 across the shorter rectangular sides of mesh network 500. Links 504 connect the nodes 502 across the longer diagonals of the mesh network 500. In one example embodiment of the invention, links 504 use a first microwave access technology and links 506 use a second microwave access technology. The first microwave access technology may use a first wavelength band, and the second microwave access technology may use a second wavelength band. The first and second wavelength bands may be selected from any of a number of carrier bands, such as common carrier bands of 2, 4, 6, 10, 11, 18, 23, and 28 gigahertz (GHz); unlicensed bands (e.g., the Industrial, Scientific, and Medical (ISM) radio band at 2.4 GHz, the Unlicensed National Information Infrastructure (UNII) radio bands at 5.8 GHz; and E-band; Extremely High Frequency (EHF) bands at 71-91 GHz; and auctioned carrier bands applicable with PTP (point to point) radios (e.g., 700, 800, and 1900 MHz), broadband radio service (BRS) at 2.5 GHz, all Local Multipoint Distribution Service (LMDS) bands at 28 GHz through 39 GHz, and millimeter wave radio bands. In another example embodiment of the invention, the first access technology may be a microwave-based access technology and the second access technology may be a fiber-based access technology. Other access technologies, such as wire-based access technologies, may also be used for the link types.

FIG. 5 also exhibits one embodiment of a more general view of a hybrid mesh communication system. For example, such a network may contain two nodes (e.g., lower-left and upper-right nodes 502). A first path between the two nodes (e.g., the left and upper links 506) and a second path between the two nodes (e.g., the lower and right links 506) each employ a first access technology. In addition, a third path between the nodes (e.g., the link 504 joining the lower-left and upper-right nodes 502) exists which uses a second access technology.

Figure 6:
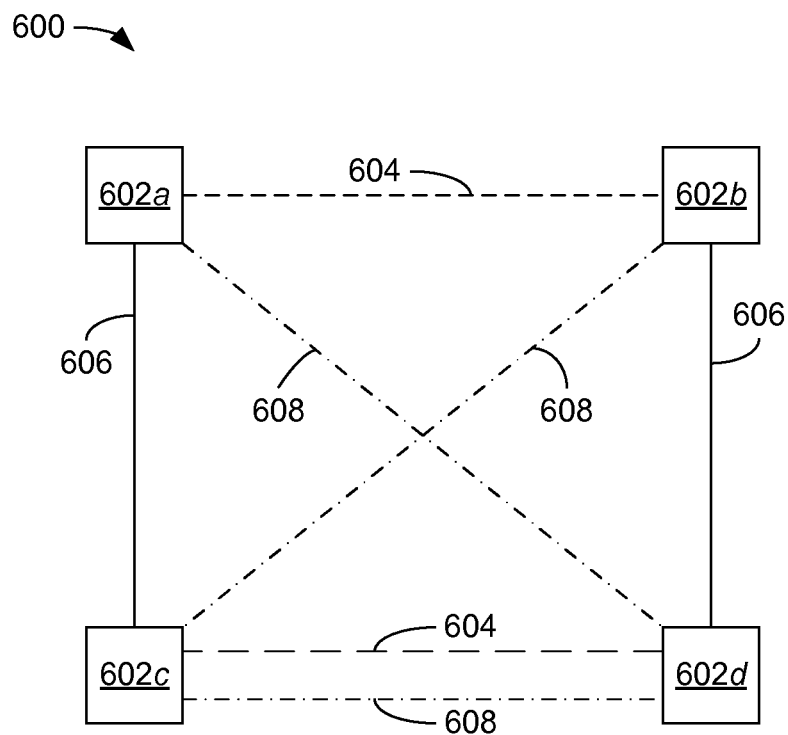
FIG. 6 is a diagram of hybrid mesh network in an example embodiment of the invention.

FIG. 6 is a diagram of hybrid mesh network 600 in another embodiment of the invention. Hybrid mesh network 600 has nodes 602a-d, and links 604, 606, 608. The node layout and number of nodes shown in mesh network 600 have been limited for clarity. Links 604 use a first access technology, links 606 use a second access technology, and links 608 use a third access technology. Links 606 are generally used over the shortest distance paths between nodes 602, links 604 are generally used over the medium distance paths between nodes 602, and links 608 are generally used over the longest distance paths between nodes 602. In some cases two different links may couple the same two nodes, wherein the two different links use different access technology. For example, node 602c and node 602d are coupled together with both a link 604 using the first access technology, and a link 608 employing the third access technology. In one example embodiment of the invention, links 608 use a fiber-based access technology, links 604 use a first microwave-based access technology, and links 606 use a second microwave-based access technology. In another embodiment, links 608 use a fiber-based access technology, links 604 use a wireline-based access technology, and links 606 use a microwave-based access technology. Integrating the different access technologies into a hybrid technology mesh design extends the reach of the access network 600, with the only limitation being the absolute delay limits of the application being transported over the network. The service level management of the complete mesh 600 insures that latency-sensitive applications are appropriately routed, especially during link failures.

Figure 7:
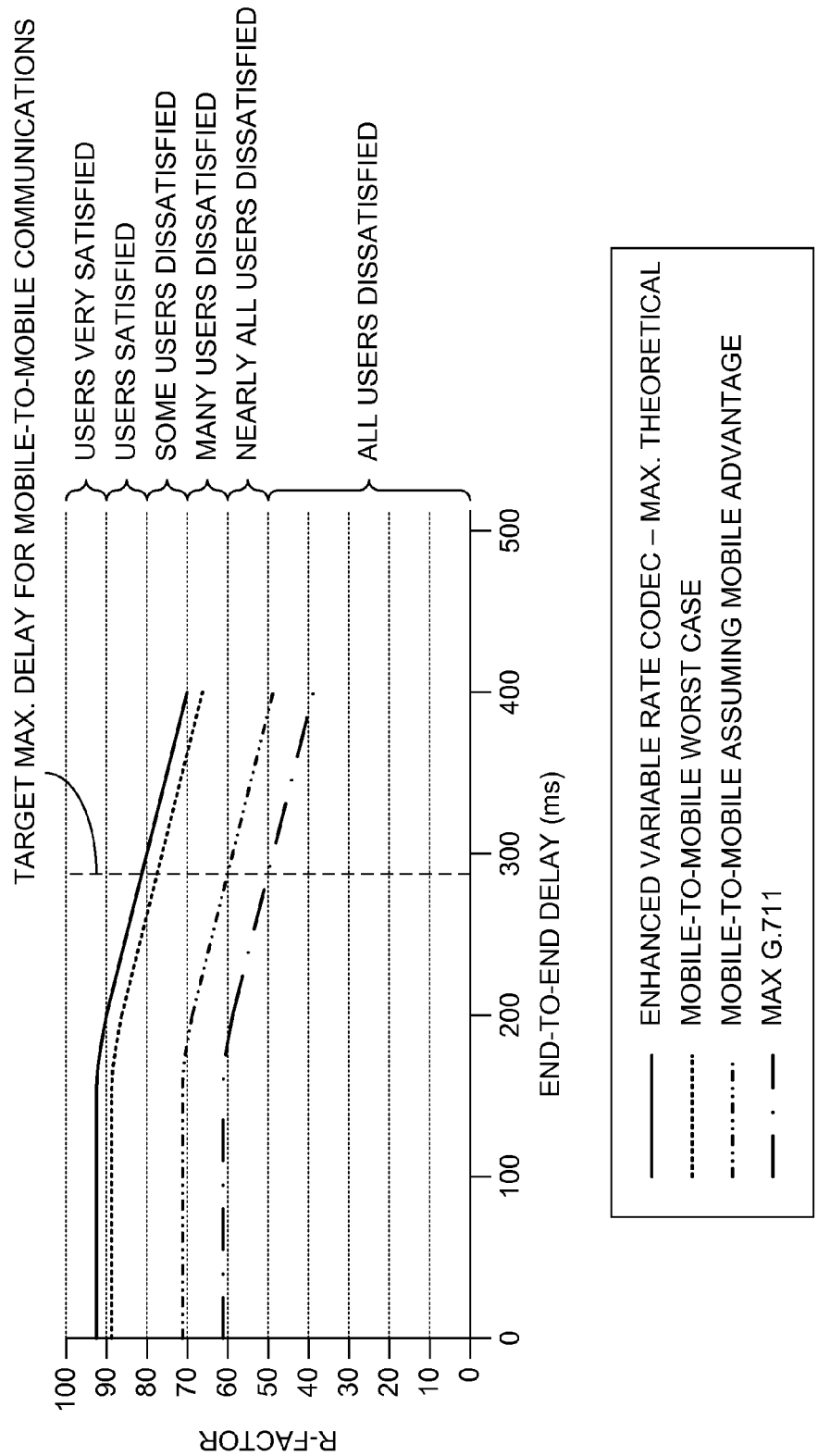
FIG. 7 is a graph relating transmission quality to delay time in a network according to an example embodiment of the invention.

FIG. 7 describes the relationship between transmission quality (referred to as "R-factor") and delay time in an example embodiment of the invention. This relationship indicates how mobile-to-mobile voice call quality is affected by latency (delay). Generally, latency is the wait time between transmitting a query and receiving a reply. Telecommunications networks are engineered for roundtrip latency limits under normal operation. Each path within a telecommunications network may have a specific latency associated with it. Latency comprises a number of delay components, such as propagation delay, transmission delay, and processing delay. In certain types of communication configurations, latency can also include the amount of time elapsed between transmitting and receiving data. For example, next generation Mobile Radio Access Networks (RANs) utilizing packet voice technology will be increasingly sensitive to added delay in the voice transmission path. Another example is found with Mobile RAN soft hand-off differential delay variations between adjacent cell sites, possibly causing mobile calls to be dropped when delay parameters are exceeded. Packet voice (e.g., coder-decoder, or CODEC) based fixed services utilizing a multi-mesh architecture are also sensitive to transmission delay increases. Given such issues, management of quality parameters for latency associated with a particular service level at both a topology level and at a restoration path level is desirable.

In one embodiment, implementation for the hybrid mesh network may include the integration/translation between the various sub-mesh network protocols employed (e.g., to pass and process information of the network state, available capacity, best route, neighbor status, and so on), an end-to-end operation support system (OSS) view, and an overarching route optimizer. A mesh sub-network could be a wireline mesh-based, Ethernet-over-Multiprotocol Label Switching (MPLS)-over-fiber network with practically unlimited transport capacity and the ability to handle 10/100 megabit-per-second (Mb/s) Ethernet or Gigabit Ethernet (GigE) interfaces. Alternately, a mesh sub-network could be an Ethernet-over-Synchronous Optical Network (SONET) network with similar Ethernet interface types supported, as well as a full gamut of time-division-multiplexed (TDM) interfaces available. In another implementation, a mesh sub-network could be a wireless mesh-based E-band millimeter wave radio network with capacity limitations of 1.5 gigabits per second (Gbps) that supports Optical Carrier level (OC-x), 10/100 Mb/s and GigE interfaces. Alternately, the sub-network could be a wireless mesh-based common carrier radio network with a capacity limitation of 200 Mb/s that can handle a variety of TDM or packet interfaces. In any metropolitan area, these and other access networks could be used by a network operator for access. In one example embodiment of the invention, the hybrid mesh network combines two or more of these types of heterogeneous sub-networks into a single hybrid network. The single hybrid network may be managed by combining these disparate, heterogeneous sub-networks in such a way as to optimize for cost, performance, or both. In another example embodiment of the invention, the hybrid mesh network may integrate two or more access technologies throughout the hybrid mesh network and would not have any identifiable distinct heterogeneous sub-networks.

Figure 8:
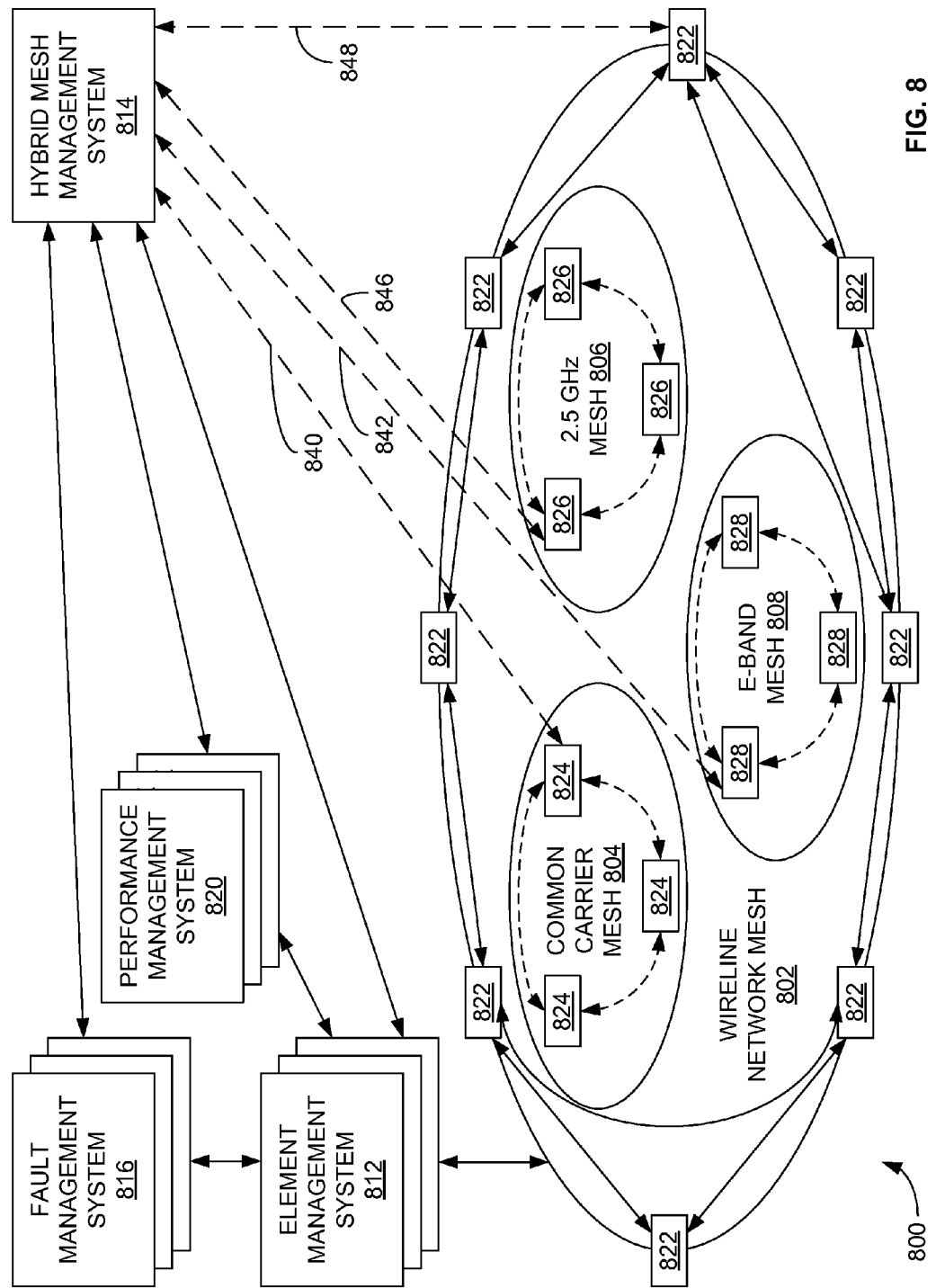
FIG. 8 is a diagram of a hybrid mesh network in an example embodiment of the invention.

FIG. 8 is a diagram of a hybrid mesh network 800 in another embodiment of the invention. Hybrid mesh network 800 comprises wireline mesh sub-network 802, common carrier mesh sub-network 804, 2.5 GHz mesh sub-network 806, E-band mesh sub-network 808, element management systems 812, hybrid mesh management system 814, fault management systems 816 and performance management systems 820. Wireline mesh sub-network 802 has a plurality of nodes 822 that are coupled together into a mesh sub-network 802. Common carrier mesh sub-network 804 includes a plurality of nodes 824 that are coupled together into the mesh sub-network 804. 2.5 GHz mesh sub-network 806 has a plurality of nodes 826 that are coupled together into the mesh sub-network 806. E-band mesh sub-network 808 includes a plurality of nodes 828 that are coupled together into the mesh sub-network 808. In one example embodiment of the invention, each sub-network may use a particular access technology as the primary means to couple together the nodes of that sub-network. For example, the common carrier mesh sub-network 804 may use common carrier band links as the primary method to couple the nodes 824 together. A plurality of links then couples the different nodes of the four sub-networks 802, 804, 806, 808 together into a hybrid mesh network. In another implementation, one or more of the different sub-networks 802, 804, 806, 808 may not have a primary type of access technology, but may blend a plurality of different access technologies together.

In one embodiment, each mesh sub-network 802, 804, 806, 808 may have an element management system 812 coupled to the sub-network. Each of the element management systems 812 manages the individual elements of its respective sub-network 802, 804, 806, 808. Each sub-network 802, 804, 806, 808 may also have its own fault management system 816 and performance management system 820. The fault performance systems 816 and performance management systems 820 should be viewed as standard systems of their respective types as found commonly today in telecommunications operator networks. The fault management systems 816 and performance management systems 820 are each coupled to their respective element management system 812. The fault management systems 816, the performance management systems 820, and the element management systems 812 are coupled to a hybrid mesh management system 814. Each of the mesh sub-networks 802, 804, 806, 810 may also be coupled to the hybrid mesh management system 814. In another implementation, the mesh sub-networks 802, 804, 806, 810 would couple to a single fault management system 816 and a single performance management system 820. Further, each of these embodiments may be considered as employing a single system including a fault management system 816 and a performance management system 820, thus operating as a fault and performance management system.

Figure 9:
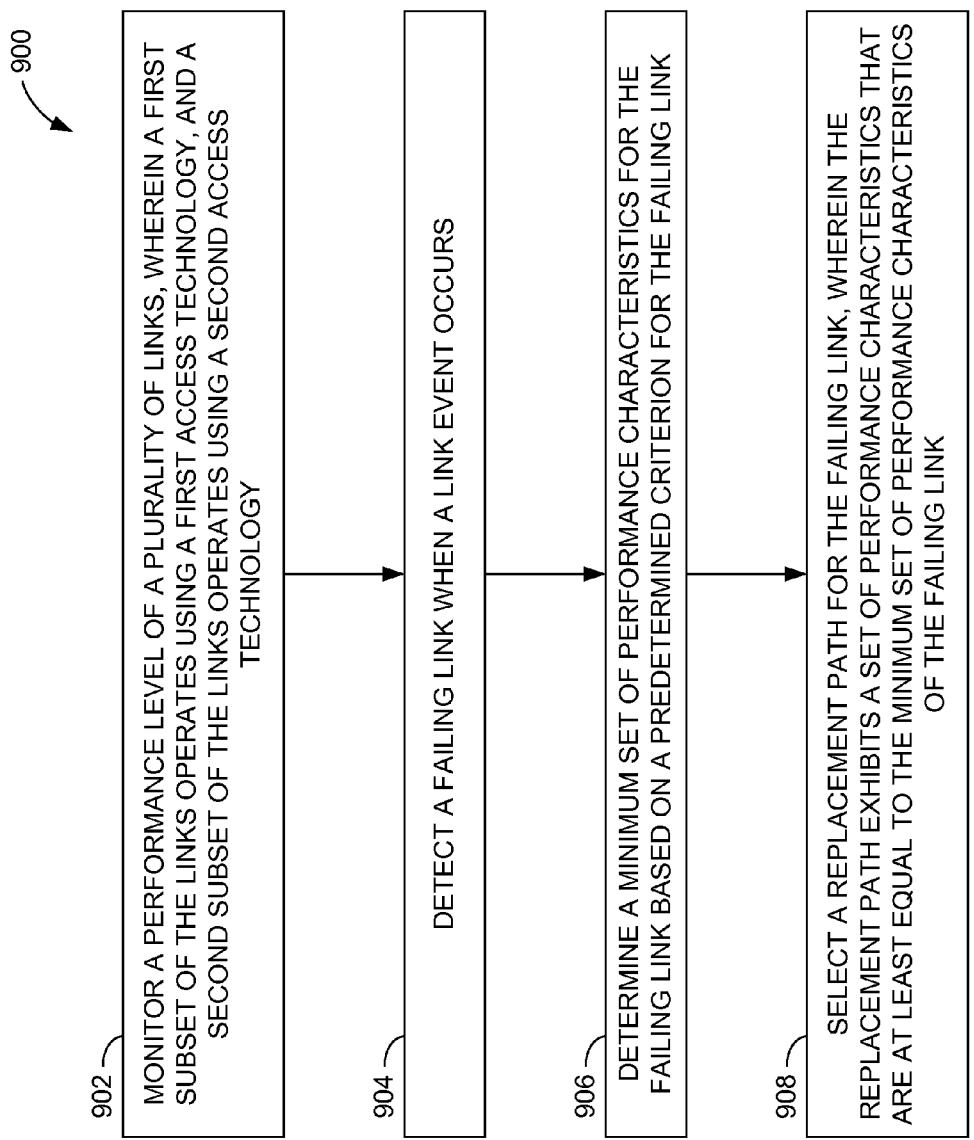
FIG. 9 is a flow diagram of a method for operating for a hybrid mesh network in an example embodiment of the invention.

FIG. 9 is a flow diagram of a method for operating a hybrid mesh network, such as the hybrid mesh network 800 of FIG. 8, in an example embodiment of the invention. First, a performance level of a plurality of links may be monitored (operation 902). In one example, a first subset of the links operates using a first access technology, and a second subset of the plurality of links operates using a second access technology.

A failing link is then detected when a link event occurs (operation 904). In one embodiment, a link event may be a decrease in a performance level of the failing link below a threshold. In another example, the link event may be a traffic level exceeding the capacity of the failing link by a predetermined amount. In yet another implementation, the link event may be a more predictive or preemptive event, such as when a storm is expected, or a future link outage, such as a maintenance action, is known beforehand.

A minimum set of performance characteristics for the failing link may be determined based on a predetermined criterion for the failing link (operation 906). The predetermined criterion may be, for example, a traffic type scheduled to use the failing link. In another example, the criterion may be an expected performance level of the access technology associated with the failing link. These and other criteria likely affect or determine the performance characteristics expected of the failing link. Examples of such performance characteristics of the failing link may be, for example, a minimum traffic capacity, a maximum latency limit, jitter, a maximum packet loss rate, a maximum bit error rate, an average data rate, and others.

A replacement path for the failing link is then selected (operation 908). In one embodiment, the replacement path exhibits a set of performance characteristics that are at least equal to the minimum set of performance characteristics of the failing link. In one embodiment, the replacement path is selected from one or more alternate hybrid mesh network configurations developed by a method of dynamically correlating performance characteristics relating to various aspects of the network. This correlation is described in greater detail later in connection with FIG. 10.

The method 900 may be performed in conjunction with the hybrid mesh network 800 according to one embodiment of the invention as follows. On the occurrence of an event, such as, for example, a link failure, the hybrid mesh management system 814 may formulate commands for the elements and/or sub-networks within the hybrid mesh network 800 to configure alternate links and paths to ensure that the performance characteristics of the services being transported are within bounds as defined by one or more pertinent service level agreement (SLAs). The hybrid mesh management system 814 may also have the capability to query the elements of the appropriate discrete access networks 802, 804, 806, 808 for more information regarding the event if the information provided by the fault management systems 816 and the performance management systems 820 is deemed inadequate to appropriately manage the network event. This communication may occur through the element management systems 812 of the elements employed in the discrete sub-networks 802, 804, 806, 808. Other network or link events may include heavy traffic across some or all of the hybrid mesh network 800, maintenance actions, weather-related events, and the like.

Figure 10:
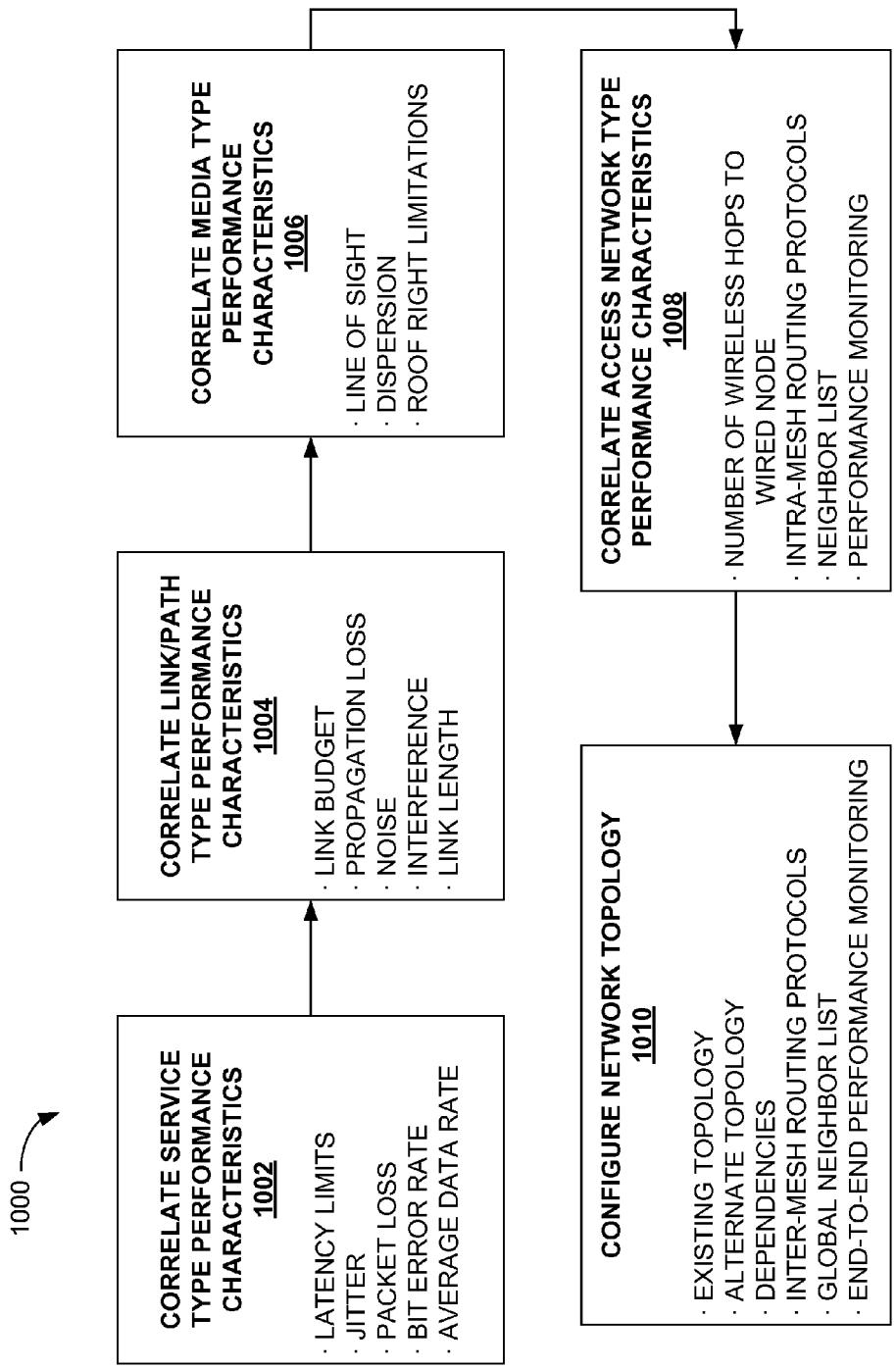
FIG. 10 is a flow diagram of a method for operating a hybrid mesh management system according to an embodiment of the invention.

In one embodiment, the hybrid mesh management system 814 may possess the ability to dynamically correlate various aspects of the hybrid mesh network 800 to ensure that the bounds on performance characteristics of the services being transported are not exceeded when a carrier employs discrete sub-networks 802, 804, 806, 808 for access, and when reconfiguration of the hybrid mesh network 800 is required due to a network event. FIG. 10, described in greater detail below, depicts the decision and correlation activity that may occur for successful use of this type network 800 in one embodiment. This dynamic management system capability includes the ability to automatically reconfigure the hybrid mesh network 800 when one or more of the mesh sub-networks 802, 804, 806, 808 is disabled due to manmade or natural disasters, as well as the optimization of the network 800 upon recovery of the above mentioned mesh sub-networks. The hybrid mesh management system 814 may include the capability to plan ahead by reserving appropriate resources (e.g., transport capacity) or acquiring additional resources when the occurrence of such events is known in advance or predictable in the near future.

When a network or link event alters the normal operation of the hybrid mesh network 800, established latency limits might be exceeded. Jitter may also become a more prevalent problem. Jitter is an abrupt and unwanted variation of one or more signal characteristics, such as the interval between successive pulses, the amplitude of successive cycles, or the frequency or phase of successive cycles. If a network provides various wait times for different packets, jitter is introduced into the network, which can be particularly disruptive for voice communication.

The fault management systems 816 and performance management systems 820 may communicate via interfaces with the hybrid mesh management system 814. From the information communicated by the fault management systems 816 and/or performance management systems 820, the hybrid mesh management system 814 will recognize that an event has occurred on one or more of the mesh sub-networks 802, 804, 806, 808 that make up the hybrid mesh network 800. Upon receipt of the alarm and/or performance data indicating a network or link event, the hybrid mesh management system 814 will query a system database for information on media type, link, path and service type that are involved in the network or link event.

In one embodiment, using the hybrid mesh network 800 as an example, the hybrid mesh management system 814 may possess the ability to dynamically correlate, compare, or balance various aspects of the hybrid mesh network 800 to ensure that the bounds on performance characteristics of the services being transported are not exceeded when a carrier employs discrete sub-networks 802, 804, 806, 808 for access, and when reconfiguration of the hybrid mesh network 800 is required due to a network event.

FIG. 10 illustrates one example of such a method of operating a hybrid mesh management system, such as the hybrid mesh management system 814 of FIG. 8. For one, the different service types or levels provided by the hybrid mesh network 800, and their associated performance characteristics, are correlated (operation 1002). One possible service type is voice, for example, which may have a set of requirements including latency limits, jitter, bit error rate, average data rate, and the like. Each type of service may have a different set of requirements. The different link types/access technologies provided by the network 800 are then correlated (operation 1004). Each link type/access technology has a set of performance characteristics associated with the different links. These particular performance characteristics may include link budget, propagation loss, noise, interference, link length, and others. Thereafter, the media types of each link, and their respective performance characteristics, are correlated (operation 1006). The media types may include, for example, wireless, wireline and optical media. The performance characteristics of each media type may include, for example, line of sight, dispersion, roof right limitations, and others. The different mesh sub-networks 802, 804, 806, 808 and their performance characteristics are correlated (operation 1008). The performance characteristics associated with each of the different sub-networks may include the number of wireless hops to a wired node, a neighbor list, the intra-mesh routing protocols employed, the performance monitoring employed, and so on. After the various correlations have been performed, the hybrid mesh network 800 is configured (operation 1010). The resulting configuration for the hybrid mesh network 800 is based on the information yielded from operations 902, 904, 906 and 908. Using this information, a hybrid mesh topology is developed, and alternate mesh topologies may be developed for balancing varying traffic levels or in case of network or link events. In addition, a set of characteristics, such as dependencies, inter-mesh routing protocols, a global neighbor list, end-to-end performance monitoring, and the like, may be created for each of the different topologies.

Some links in the hybrid mesh network 800 may cost more to use than other links in the hybrid mesh network 800. The cost for use of a link may depend on the access technology used by the link, the physical properties of the link, ownership of the link, tax or other governmental regulations, state or local boundaries crossed by the link, the type of traffic sent across the link, and other factors. The cost for using each of the links in the hybrid mesh network 800 may be correlated along with the other link properties or characteristics, and utilized by the hybrid mesh management system 814 when configuring the topology of the network 800 during normal operation, or when reconfiguring the mesh network 800 during a network event.

Various embodiments of the invention described herein may exhibit one or more of the following advantages, many of which have been discussed earlier. As seen above, interconnecting multiple mesh access technologies to form a hybrid mesh network may allow greater flexibility in design configurations in order to deliver a required or desired performance level. Also, a measure of redundancy and survivability, resulting in enhanced network reliability and performance, may be realized. Also, with such a "mix-and-match" approach to network design, optimizing the hybrid network to specific conditions, such as the local geographical terrain, is possible. In addition, existing wireline and wireless mesh networks may be supplemented with additional mesh networks employing other access technologies to form a hybrid network, thus reducing the overall cost of the network while incurring its benefits.

What is claimed is:

1. A method for operating a hybrid mesh network comprising a plurality of links and a plurality of nodes, the method comprising:
   monitoring a performance level of the plurality of links coupling together the plurality of nodes with a performance and fault management system, wherein a first subset of the plurality of links operates using a first access technology, and a second subset of the plurality of links operates using a second access technology;
   detecting a failing link in the first subset of the plurality of links when a link event occurs, wherein a link event occurs when a performance level of the failing link drops below a threshold;
   identifying traffic of a first service type and traffic of a second service type being sent over the failing link;
   determining a minimum set of performance characteristics for the failing link based on a predetermined criterion for the failing link with a hybrid mesh management system, wherein the predetermined criterion comprises performance characteristics inherent to the second access technology, wherein the performance characteristics inherent to the second access technology do not satisfy performance characteristics for sending the traffic of the first service type;
   selecting a first replacement path for the traffic of the first service type and a second replacement path for the traffic of the second service type with the hybrid mesh management system, wherein the first and second replacement paths comprise one or more links of the plurality of links having a set of performance characteristics that are at least equal to the minimum set of performance characteristics of the failing link and wherein the first replacement path does not include a link of the second subset of the plurality of links.

2. The method for operating a hybrid mesh network of claim 1, wherein the predetermined criterion comprises an expected performance level of the access technology used by the failing link.

3. The method for operating a hybrid mesh network of claim 2, wherein the expected performance level of the access technology used by the failing link determines a capacity.

4. The method for operating a hybrid mesh network of claim 2, wherein the expected performance level of the access technology used by the failing link determines at least one of a latency limit and a jitter associated with the first and second replacement links.

5. The method for operating a hybrid mesh network of claim 1, wherein the first and second replacement paths are equivalent paths.

6. The method for operating a hybrid mesh network of claim 1, wherein a link event occurs when a predetermined capacity of the failing link is exceeded by a predetermined amount.

7. The method for operating a hybrid mesh network of claim 1, wherein a first one of the two different access technologies comprises a first microwave-based technology, and a second one of the two different access technologies is selected from a group consisting of a second microwave-based technology, an optical technology, and a wireline technology.

8. The method for operating a hybrid mesh network of claim 1, wherein a first one of the two different access technologies comprises a first microwave-based technology at a first wavelength band, and a second one of the two different access technologies comprises a second microwave-based technology at a second wavelength band.

9. The method for operating a hybrid mesh network of claim 1, wherein the minimum set of performance characteristics comprises a maximum packet loss rate.

10. The method for operating a hybrid mesh network of claim 1, wherein the minimum set of performance characteristics comprises at least one of a maximum latency, a maximum jitter, a maximum bit error rate, an average data rate, a minimum capacity, and a cost associated with link usage.

11. The method for operating a hybrid mesh network of claim 1, wherein the first subset of the plurality of links forms a homogeneous mesh sub-network.

12. A hybrid mesh network, comprising:
   a plurality of nodes coupled together with a plurality of links, wherein a first set of the plurality of links uses a first access technology, and a second set of the plurality of links uses a second access technology; and
   a performance and fault management system configured to monitor the plurality of links to detect a failing link on the occurrence of a link event, wherein a link event occurs when a performance level of the failing link drops below a threshold, wherein the performance and fault management system notifies a hybrid mesh management system of the failing link;
   wherein the hybrid mesh management system is configured to identify traffic of a first service type and traffic of a second service type being sent over the failing link replace the failing link with at least one alternate link selected from the plurality of links each for the traffic of the first service type and the traffic of the second service type, wherein the at least one alternate link for the traffic of the first service type does not include a link of the second set of the plurality of links; and wherein the alternate link is selected based on a predetermined criterion of the failing link, wherein the predetermined criterion comprises performance characteristics inherent to the second access technology, wherein the performance characteristics inherent to the second access technology do not satisfy performance characteristics for sending the traffic of the first service type.

13. The hybrid mesh network of claim 12, wherein the threshold for detecting a link event is based in part on the access technology of the failing link.

14. The hybrid mesh network of claim 12, wherein a link event occurs when a capacity of the failing link is exceeded by a predetermined amount.

15. The hybrid mesh network of claim 12, wherein the predetermined criterion is an expected performance level of the access technology used by the failing link.

16. The hybrid mesh network of claim 12, wherein the predetermined criterion is a cost associated with using the failing link.

17. The hybrid mesh network of claim 12, wherein the alternate link is selected based in part on the access technology used by the alternate link.

18. The hybrid mesh network of claim 12, wherein the alternate link is selected based in part on requirements of a service level agreement for traffic flowing across the failing link.

19. The hybrid mesh network of claim 12, further comprising:
- a first mesh sub-network, wherein the first mesh sub-network comprises the first set of the plurality of links; and
- a second mesh sub-network, wherein the second mesh sub-network comprises the second set of the plurality of links.

20. The hybrid mesh network of claim 16, wherein the first mesh sub-network is a homogeneous mesh sub-network.

21. The hybrid mesh network of claim 16, wherein the second mesh sub-network is a homogeneous mesh sub-network.

22. The hybrid mesh network of claim 12, wherein the performance and management subsystem comprises:
- a first performance and fault management sub-system configured to monitor the first set of the plurality of links; and
- a second performance and fault management sub-system configured to monitor the second set of the plurality of links.

* * * * *

UNITED STATES PATENT AND TRADEMARK OFFICE
CERTIFICATE OF CORRECTION

PATENT NO. : 8,570,859 B1  Page 1 of 1
APPLICATION NO. : 13/036266
DATED : October 29, 2013
INVENTOR(S) : Durga Prasad Satapathy, Bruce E. Hoffman and Harold Wayne Johnson It is certified that error appears in the above-identified patent and that said Letters Patent is hereby corrected as shown below:

On the Title Page 1, (73) the Assignee is incorrect. The Assignee reading "Sprint Spectrum L.P.", should read --Sprint Communications Company L.P.--

Signed and Sealed this
Seventeenth Day of March, 2015

Michelle K. Lee
*Director of the United States Patent and Trademark Office*